US011108991B2

(12) United States Patent
Zavesky et al.

(10) Patent No.: US 11,108,991 B2
(45) Date of Patent: Aug. 31, 2021

(54) METHOD AND APPARATUS FOR CONTEXTUAL INCLUSION OF OBJECTS IN A CONFERENCE

(71) Applicant: AT&T Intellectual Property I, L.P., Atlanta, GA (US)

(72) Inventors: Eric Zavesky, Austin, TX (US); Zhu Liu, Marlboro, NJ (US); Tan Xu, Bridgewater, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/732,418

(22) Filed: Jan. 2, 2020

(65) Prior Publication Data

US 2020/0145617 A1 May 7, 2020

Related U.S. Application Data

(63) Continuation of application No. 16/148,074, filed on Oct. 1, 2018, now Pat. No. 10,554,931.

(51) Int. Cl.
*H04N 7/15* (2006.01)
*G06K 9/72* (2006.01)
(Continued)

(52) U.S. Cl.
CPC ......... *H04N 7/157* (2013.01); *G06K 9/00624* (2013.01); *G06K 9/6215* (2013.01);
(Continued)

(58) Field of Classification Search
CPC .. H04N 7/157; H04N 21/42204; H04N 7/147; H04N 7/152; G06K 9/72;
(Continued)

(56) References Cited

U.S. PATENT DOCUMENTS 7,840,638 B2 11/2010 Zhang et al.
8,400,490 B2 3/2013 Apostolopoulos et al.
(Continued)

FOREIGN PATENT DOCUMENTS

CA 2953186 A1 6/2018
EP 3282998 A1 2/2018
(Continued)

OTHER PUBLICATIONS

Hyder, Mansoor et al., "Placing the participants of a spatial audio conference call", IEEE Consumer Communications and Networking Conference. 2010, pp. 1-7.
(Continued)

*Primary Examiner* — Stella L. Woo
(74) *Attorney, Agent, or Firm* — Guntin & Gust, PLC; Mark Wilinski

(57) ABSTRACT

Aspects of the subject disclosure may include, for example, an assessment of a context associated with a conference, an identification of an object associated with the conference in accordance with the context, and a presentation of the object as part of the conference. The conference may include a videoconference and the object may include a physical object, a virtual object, or a combination thereof. Other embodiments are disclosed.

20 Claims, 8 Drawing Sheets

(51) Int. Cl.
  *G06K 9/00* (2006.01)
  *G06K 9/62* (2006.01)
  *G10L 15/18* (2013.01)
  *H04N 7/14* (2006.01)
  *H04N 21/422* (2011.01)
  *G06K 9/46* (2006.01)
  *G06T 19/00* (2011.01)
  *G06T 15/20* (2011.01)

(52) U.S. Cl.
  CPC ............... *G06K 9/72* (2013.01); *G10L 15/18* (2013.01); *H04N 7/147* (2013.01); *H04N 21/42204* (2013.01); *G06K 9/46* (2013.01); *G06T 15/20* (2013.01); *G06T 19/006* (2013.01); *G06T 2219/024* (2013.01)

(58) Field of Classification Search
  CPC .... G06K 9/00624; G06K 9/6215; G06K 9/46; G10L 15/18; G10L 25/51; G10L 15/26; G06T 2219/024; G06T 19/006; G06T 15/20
  See application file for complete search history.

(56) References Cited

U.S. PATENT DOCUMENTS

| | | | |
|---|---|---|---|
| 8,469,713 B2 | 6/2013 | Kron et al. | |
| 8,675,067 B2 | 3/2014 | Chou et al. | |
| 9,007,427 B2 | 4/2015 | Hoover et al. | |
| 9,628,630 B2 | 4/2017 | Cartwright et al. | |
| 9,654,734 B1 | 5/2017 | High et al. | |
| 9,788,179 B1 | 10/2017 | Sharifi et al. | |
| 9,800,831 B2 | 10/2017 | Diao | |
| 9,959,676 B2 | 5/2018 | Barzuza et al. | |
| 10,013,805 B2 | 7/2018 | Barzuza et al. | |
| 10,554,931 B1* | 2/2020 | Zavesky | G06K 9/6215 |
| 2004/0128350 A1 | 7/2004 | Topfl et al. | |
| 2009/0098524 A1 | 4/2009 | Walton | |
| 2009/0119604 A1* | 5/2009 | Simard | G06Q 10/10 |
| | | | 715/757 |
| 2010/0064010 A1 | 3/2010 | Alkov et al. | |
| 2012/0204120 A1 | 8/2012 | Lefar et al. | |
| 2014/0139609 A1* | 5/2014 | Lu | G06T 11/60 |
| | | | 348/14.03 |
| 2014/0240444 A1 | 8/2014 | Szymczyk et al. | |
| 2017/0091628 A1 | 3/2017 | Nachman et al. | |
| 2017/0103440 A1 | 4/2017 | Xing et al. | |
| 2017/0318261 A1 | 11/2017 | Dalvi et al. | |
| 2018/0115769 A1 | 4/2018 | Salome et al. | |
| 2018/0176508 A1* | 6/2018 | Pell | H04N 19/85 |
| 2018/0176511 A1 | 6/2018 | Jurrius et al. | |
| 2018/0184044 A1 | 6/2018 | Yue et al. | |
| 2018/0189974 A1 | 7/2018 | Clark et al. | |
| 2018/0367757 A1 | 12/2018 | Faulkner et al. | |
| 2019/0065895 A1 | 2/2019 | Wang et al. | |
| 2019/0313058 A1* | 10/2019 | Harrison | G06K 9/6215 |
| 2019/0370544 A1* | 12/2019 | Wright, Jr. | G06F 3/0488 |
| 2019/0371060 A1* | 12/2019 | Energin | H04N 7/147 |
| 2020/0278742 A1* | 9/2020 | Rajan | G06F 3/017 |

FOREIGN PATENT DOCUMENTS

| | | |
|---|---|---|
| KR | 20110066298 A | 6/2011 |
| WO | 0065461 A1 | 11/2000 |
| WO | 2017127571 A1 | 7/2017 |
| WO | 2018131035 A1 | 7/2018 |

OTHER PUBLICATIONS

Pfeiffer, Theis et al., "Ubiquitous Virtual Reality: Accessing Shared Virtual Environments through Videoconferencing Technology", TPCG (2005): 209-216.

Wang, Rui et al., "Here and there: Experiencing co-presence through mixed reality-mediated collaborative design system", Computer and Information Technology, 2008. CIT 2008. 8th IEEE International Conference on. IEEE, 2008, pp. 1-6.

Ware, Colin et al., "Fish tank virtual reality", Proceedings of the Interact'93 and CHI'93 conference on Human factors in computing systems. ACM, 1993, pp. 1-6.

\* cited by examiner

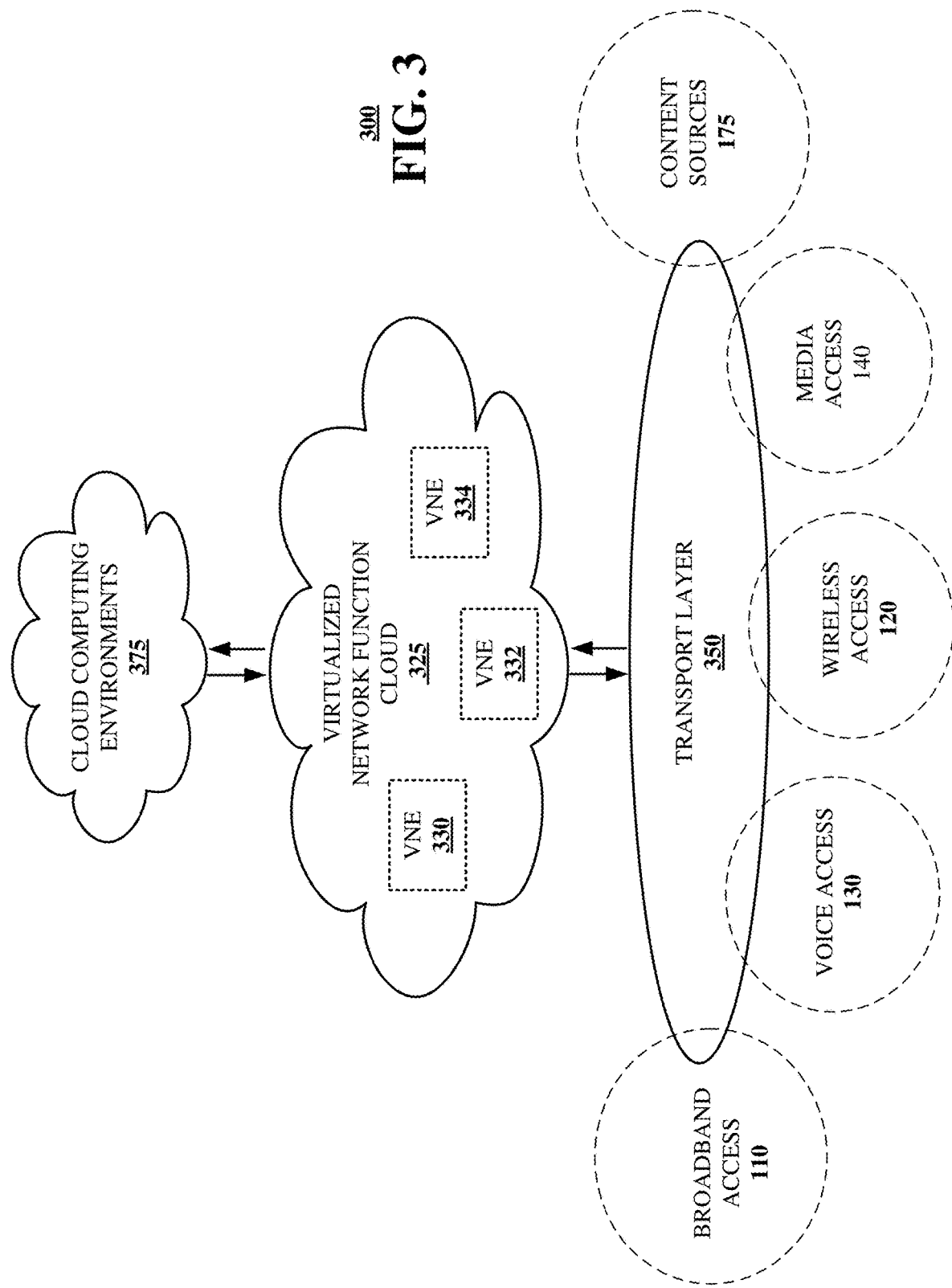

METHOD AND APPARATUS FOR CONTEXTUAL INCLUSION OF OBJECTS IN A CONFERENCE

CROSS REFERENCE TO RELATED APPLICATIONS

This application is a continuation of U.S. patent application Ser. No. 16/148,074 filed on Oct. 1, 2018. All sections of the aforementioned application are incorporated herein by reference in their entirety.

FIELD OF THE DISCLOSURE

The subject disclosure relates to methods and apparatuses for contextual inclusion of objects.

BACKGROUND

In various environmental/application settings, such as for example in connection with teleconferences and videoconference interactions, users may utilize various objects as part of a presentation. For example, as part of the presentation a user/presenter may demonstrate a model, utilize a tool (e.g., a component of a computer), etc. In some instances, an audience receiving/observing the presentation might not fully appreciate the significance of the objects or how the objects relate to the content of the presentation. Additionally, to the extent that the presentation includes multiple presenters, there is often a delay/lag in terms of a transition between the contribution of a first presenter and a contribution of the second presenter. Such a delay may make following the presentation more difficult from the perspective of the audience, and may result in a portion of the content of the presentation being missed/omitted if, for example, the second presenter starts presenting material before equipment capturing the presentation is focused on the second presenter.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for including or omitting objects based on an environmental/application context. In some embodiments, the environmental/application context may include a conference, such as for example a teleconference, a videoconference, or a combination thereof. In some embodiments, a conference may include a presentation. The presentation may be provided by one or more presenters to one or more audience members. Other embodiments are described in the subject disclosure.

One or more aspects of the subject disclosure include identifying an object (e.g., a first object) associated with a conference. The object may include a physical object, a virtual object, an augmented reality object, or a combination thereof. An assessment/identification may be made regarding a context of the conference. The object may be presented in accordance with the context. The presentation of the object may include/incorporate a selection of a viewing direction associated with a camera.

In some embodiments, a first object may be included in a field of view of one or more cameras. One or more aspects of the subject disclosure include identifying a second object in the field of view. Responsive to identifying the second object, a determination may be made that a representation of the second object should be omitted in a transmission based on an assessed/identified context of a conference. The transmission may be transmitted to, e.g., a user equipment. The transmission may include a representation of the first object and exclude the representation of the second object.

One or more aspects of the subject disclosure include an assessment/identification of a context associated with a conference. In some embodiments, the assessment includes an analysis of one or more items of audio (e.g., one or more audio inputs to one or more devices).

Figure 1:
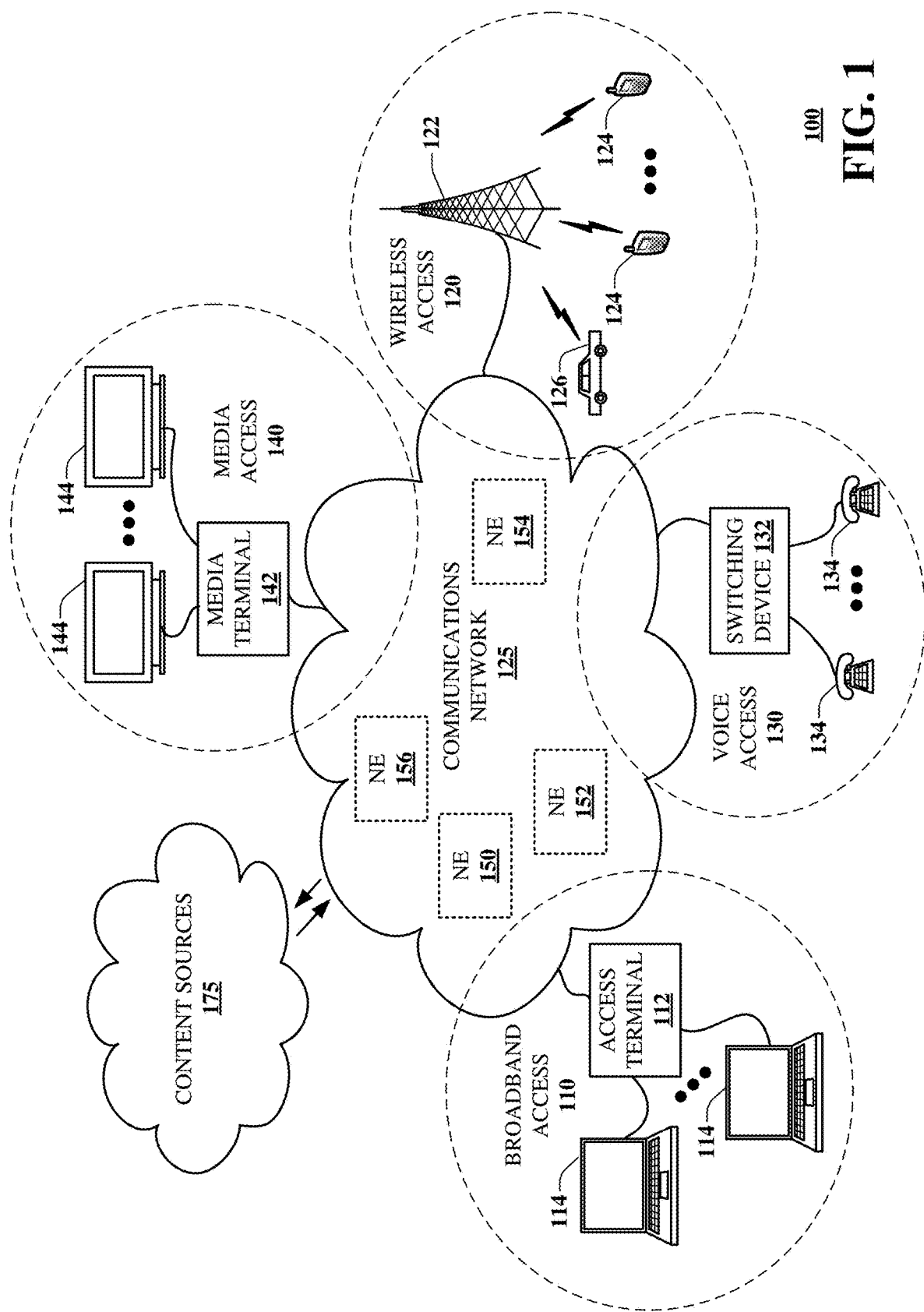
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part an identification of an object associated with a conference, an assessment of a context associated with the conference, and a presentation of the object in accordance with the context.

A communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
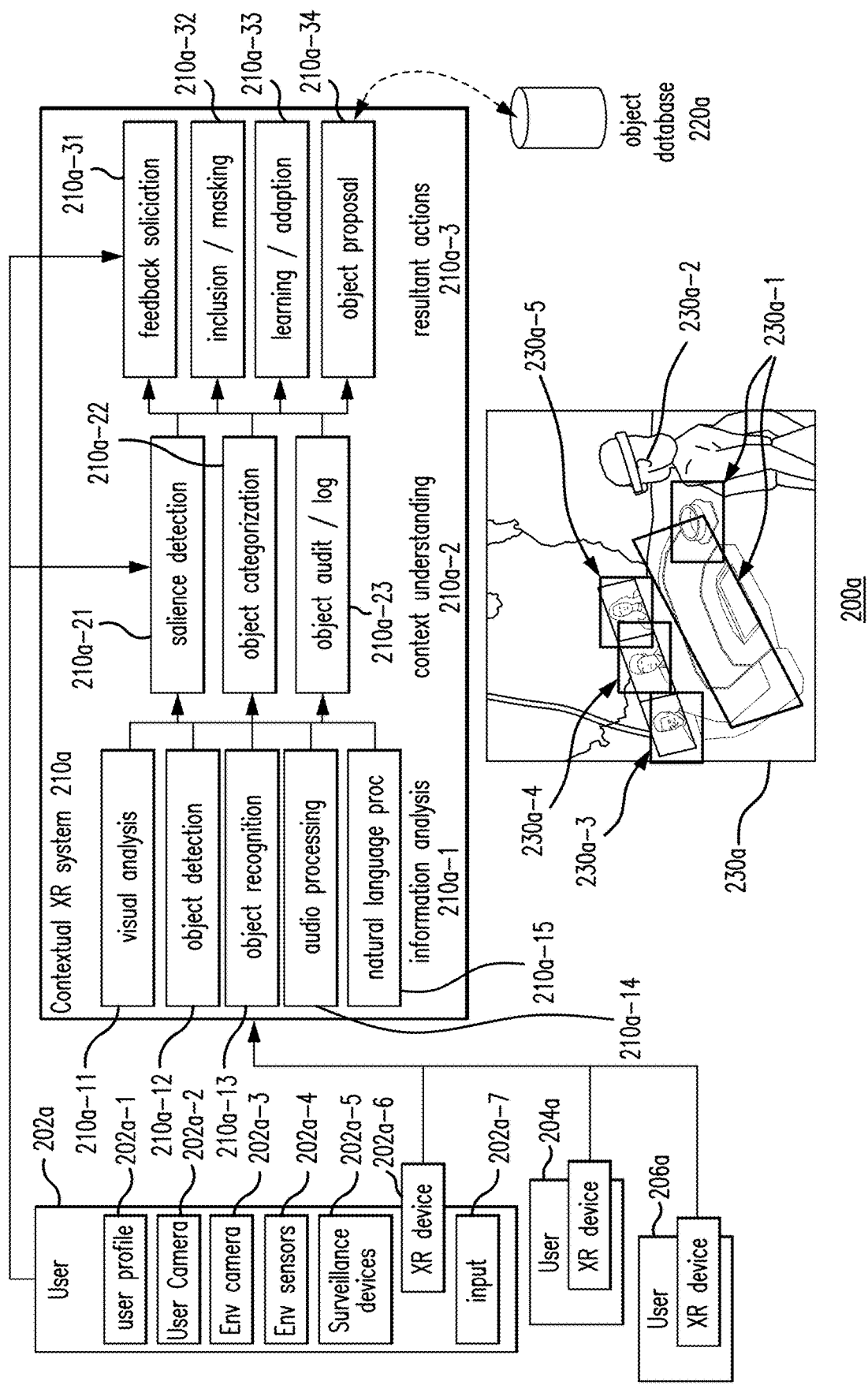
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within the communication network of FIG. 1 in accordance with various aspects described herein. The system 200a may be utilized/implemented in conjunction with one or more conferences, such as for example one or more videoconferences.

The system 200a may include one or more user devices, such as for example a first user device 202a, a second user device 204a, and a third user device 206a. While three users devices 202a-206a are shown in FIG. 2A, more or less than three user devices may be included in some embodiments.

A user device may include one or more (other) devices/components/elements. For example, as shown in FIG. 2A, the user device 202a may include a user profile 202a-1, a camera 202a-2, an environmental (env) camera 202a-3, one or more environmental (env) sensors 202a-4, one or more surveillance devices 202a-5, a cross reality/X reality (XR) device 202a-6, other input devices (represented by input 202a-7), or a combination thereof. One or more outputs of these devices/component/elements may be used to make determinations/decisions regarding objects that are to be included or omitted/excluded from a conference (e.g., a presentation). The aforementioned devices/components/elements are described in further detail below separately for the sake of convenience, with the understanding that one or more aspects associated with a first device/component/element may be incorporated as part of one or more other devices/component/elements.

The user profile 202a-1 may include a specification/identification of characteristics/parameters associated with a user of the user device 202a. For example, the user profile 202a-1 may distinguish a first user from one or more other users on the basis of, e.g., a username, a password, a personal identification number (PIN), biological characteristics (e.g., a retinal scan, facial recognition technology, etc.), etc. In some embodiments, the user profile 202a-1 may incorporate aspects of a social media platform, contacts/friends lists, messages (e.g., email, short message service (SMS) or text messages, etc.), a user schedule (e.g., a calendar), a history of consumed or posted media/content, etc. The user profile 202a-1 may capture/include user preferences, where the user preferences may include affirmative indicators by the user and/or may include passive indicators based on machine learning technologies as described below.

The user camera 202a-2 may be used to capture images, audio, video, or a combination thereof, of a user of the user device 202a. In some embodiments, the user camera 202a-2 may incorporate machine vision and/or recognition technology to focus on particular portions of the user during a conference. For example, facial recognition technology may be incorporated by the user camera 202a-2 in order to focus the user camera 202a-2 on the user's face during the conference.

The environmental camera 202a-3 may be used to capture an environment associated with the user. For example, the environmental camera 202a-3 may capture images, audio, video, or a combination thereof, associated with a background (where the user may be located in the foreground of a given camera's field of view).

The environmental sensors 202a-4 may capture one or more characteristics associated with the environment. For example, the environmental sensors 202a-4 may include temperature sensors, pressure sensors, humidity sensors, fluid sensors, wind sensors, electrical sensors, lighting/luminescence sensors, audio sensors, motion detection sensors, location sensors, etc.

The surveillance devices 202a-5 may include one or more tracking devices (e.g., location tracking devices), recorders (e.g., audio/voice recorders), radiation detection devices, temperature detection devices, security cameras, image surveillance and retrieval devices, video storage devices, voice over internet protocol (VoIP) surveillance devices, electronic article surveillance devices (e.g., radio frequency identification (RFID) tags), a breathalyzer, etc. The surveillance devices 202a-5 may be used to capture and provide information about the user of the user device 202a, potentially without knowledge on the part of the user of the user device 202a. In this respect, aspects of the surveillance devices 202*a*-5 may be designed and implemented so as to be tamper-proof. For example, if a surveillance device 202*a*-5 ceases functioning, an alert or warning may be generated at one or more other devices.

The XR device 202*a*-6 may incorporate aspects of X reality (XR) or cross reality. As one skilled in the art will appreciate, XR or cross reality is a form of a mixed reality environment that comes from a fusion/union of ubiquitous sensor/actuator network and shared online virtual worlds. XR technology may incorporate a wide spectrum of hardware, software, and/or firmware, and may include one or more sensory interfaces, applications, and/or infrastructures, that enable content creation/generation/provisioning for virtual reality (VR), augmented reality (AR), cinematic reality (CR), or a combination thereof. XR technology may be used to generate new or alternative forms of reality by incorporating objects (e.g., digital objects) into the physical world and may bring physical objects into the digital world. In this respect, XR technology may incorporate aspects of a mixed reality (MR), where traditional dividing lines between the physical world and the digital world are blended, obscured, or even eliminated. XR technology may incorporate visual/image data, audio data, or a combination thereof.

The XR device 202*a*-6 (or any other device) may aggregate the outputs (e.g., the data/information) generated/provided by the other devices (e.g., the devices 202*a*-1 through 202*a*-5 and the device 202*a*-7) of the user device 202*a* and transmit them to a contextual XR system 210*a*. The contextual XR system 210*a* may be included as part of a computing device, a network element, a server, etc.

While the contextual XR system 210*a* is shown as being separate from the user devices 202*a*-206*a*, in some embodiments at least some of the aspects of the contextual XR system 210*a* may be incorporated as part of one or more of the user devices 202*a*-206*a*. For example, if bandwidth is a bottleneck/limitation in the system 200*a*, incorporating at least part of the devices/functionality of the contextual XR system 210*a* in the user devices 202*a*-206*a* may help to preserve bandwidth related resources. On the other hand, if processing resources at the user devices 202*a*-206*a* serve as a bottleneck/limitation (e.g., processing resources are scarce), then the functionality described below in connection with the contextual XR system 210*a* being incorporated by the contextual XR system 210*a* may help to conserve processing resources at the user devices 202*a*-206*a*.

In some embodiments, the devices/functionality associated with the contextual XR system 210*a* as described below may be replicated at one or more of the user devices 202*a*-206*a*. For example, during periods of low network traffic, the XR devices (e.g., the XR device 202*a*-6) may transmit data to the contextual XR system 210*a* for analysis/processing. On the other hand, during periods of elevated/high network traffic (e.g., during periods of network congestion), the user devices 202*a*-206*a* may process/analyze the data in accordance with the functionality described below in conjunction with the contextual XR system 210*a*. In some embodiments, the processing of data/information may incorporate aspects of a peer-to-peer network where a first user device may process data/information that may be acted upon/used by a second user device.

The contextual XR system 210*a* may receive data/information from the user devices 202*a*-206*a*. The data/information received by the contextual XR system 210*a* may include outputs from one or more of the devices described above. The contextual XR system 210*a* may analyze/process the input(s) that it receives in order to control/regulate content (e.g., an object) that is potentially included as part of a conference.

The contextual XR system 210*a* is shown in FIG. 2A as including devices that are allocated to one of three groups/categories: an information analysis group 210*a*-1, a context understanding group 210*a*-2, and a resultant actions group 210*a*-3. These groupings 210*a*-1 through 210*a*-3 are shown in FIG. 2A for the sake of ease in description/illustrative convenience. A given device/component/element within a group may be reassigned/reallocated to another group without any loss of generality or accuracy in this disclosure.

The information analysis group 210*a*-1 may represent a front-end in terms of devices and/or functionality that is/are used to process/analyze the outputs provided by the user devices 202*a*-206*a*. The information analysis group 210*a*-1 may process the outputs/information provided by the user devices 202*a*-206*a* in order to identify/recognize objects as set forth below.

The information analysis group 210*a*-1 may include a visual analysis device 210*a*-11, an object detection device 210*a*-12, an object recognition device 210*a*-13, an audio processing device 210*a*-14, and a natural language processing device 210*a*-15. These devices are described in further detail below.

The visual analysis device 210*a*-11 may perform an analysis of the data/information provided by the user devices 202*a*-206*a*. For example, the visual analysis device 210*a*-11 may parse or segment image data provided by, e.g., the camera 202*a*-2 and/or 202*a*-3, potentially in accordance with one or more image processing techniques. The visual analysis device 210*a*-11 may perform such parsing/segmentation on the basis of the outputs of the user profile 202*a*-1, the environmental sensors 202*a*-4, the surveillance devices 202*a*-5, etc. For example, the visual analysis device 210*a*-11 may utilize/process such outputs as cues for purposes of interpreting or flagging portions/elements of the image data.

The object detection device 210*a*-12 may process the outputs of the visual analysis device 210*a*-11 to identify objects in the image data. For example, the object detection device 210*a*-12 may analyze/examine the image data to identify gradients (e.g., changes in the image data that are greater than a threshold) that may be characteristic of borders/boundaries between two or more objects. Similarly, the object detection device 210*a*-12 may interpret a lack of such a gradient (or, a gradient that is less than a threshold) in a portion of the data as being characteristic of an object.

The object recognition device 210*a*-13 may process the outputs of the object detection device 210*a*-12 to classify/identify an object as a particular object (e.g., a tree, a dog, a cat, a keyboard, etc.). In some embodiments, the object recognition device 210*a*-13 may consult a library/database (e.g., object database 220*a*) to identify the object. For example, the object recognition device 210*a*-13 may compare image data associated with an object detected by the object detection device 210*a*-12 to data associated with objects in the database 220*a*, and if the comparison yields a match above a threshold the object associated with the image data may be recognized. Conversely, if no such matching object is identified in the database 220*a*, a new entry may be created in the database 220*a* if, for example, the object associated with the image data can be identified using alternative techniques.

In some embodiments, the object detection or recognition provided by the devices 210*a*-12 and 210*a*-13, respectively, may be further supplemented or enhanced on the basis of the audio processing device 210*a*-14 and the natural language processing device 210a-15. For example, the audio processing device 210a-14 may examine/analyze audio captured by one or more of the devices (e.g., the user camera 202a-2) of a user device to flag/identify breaks/discontinuities in sounds, such as for example verbal communications (e.g., speech). Other audio cues, such as for example changes in volume/sound levels, inflection/tone, etc., may also be identified by the audio processing device 210a-14.

The natural language processing device 210a-15 may process the outputs of the audio processing device 210a-14 to identify language, statements, expressions, etc., included in the captured audio. Such an identification may be based on a comparison of a portion of the audio flagged/tagged by the audio processing device 210a-14 to a library/database (e.g., database 220a) of linguistics, statements, speech, expressions, etc. If the comparison yields a match above a threshold, the (portion of the) audio may be recognized and used as a cue/aid in identifying/recognizing the object in conjunction with the object recognition device 210a-13. Conversely, if no such matching audio is identified in the database, a new entry may be created in the database if, for example, the audio can be identified using alternative techniques.

The context understanding group 210a-2 may represent a secondary level in terms of devices and/or functionality that is/are used to process/analyze the outputs provided by the user devices 202a-206a. In particular, the context understanding group 210a-2 may process the outputs provided by the information analysis group 210a-1 in order to identify a context associated with the object(s) recognized by the information analysis group 210a-1 (e.g., by the object recognition device 210a-13).

As shown, the context understanding group 210a-2 may receive outputs from one or more of the user devices 202a-206a to enhance or supplement the outputs of the information analysis group 210a-1. For example, the context understanding group 210a-2 may provide a first weight to outputs provided by the user devices 202a-206a and a second weight to outputs provided by the information analysis group 210a-1. In this manner, the context understanding group 210a-2 can selectively provide greater weight to the outputs provided by the user devices 202a-206a relative to the outputs provided by the information analysis group 210a-1, or vice versa. In some embodiments, the outputs provided by the user devices 202a-206a to the context understanding group 210a-2 may be used to override outputs provided by the information analysis group 210a-1 to the context understanding group 210a-2. In this manner, authority/control may be allocated to a user of a user device, accordingly. Such control may be conditionally granted based on the user supplying one or more access credentials.

The context understanding group 210a-2 may include a salience detection device 210a-21, an object categorization device 210a-22, and an object audit/log device 210a-23. These devices are described in further detail below.

The salience detection device 210a-21 may identify/distinguish first portions of a scene (e.g., scene 230a) that have a particular weight/significance relative to other/second portions of a scene that bear a different (e.g., less) weight/significance. For example, if a conference is being conducted between members of an architectural firm in relation to a construction of a new stadium, the salience detection device 210a-21 may provide greater weight/emphasis to objects during that conference that are directly related to the stadium (e.g., materials used in the construction of the stadium, blueprints or models presented during the conference that are suspended behind a presenter, etc.) relative to other objects that may be captured that are less relevant to the construction of the stadium (e.g., a list of teams that are going to use the stadium for purposes of playing games, corporate sponsors that want to display a banner on a façade/siding of the stadium once construction is complete, etc.).

The object categorization device 210a-22 may process the outputs of the salience detection device 210a-21 to categorize/classify objects in accordance with the importance/weight assigned by the salience detection device 210a-21. Continuing the above illustrative example, objects directly associated with the construction of the stadium may be allocated to a first category/class and other objects may be allocated to a second category/class. More than two categories/classes may be used in some embodiments. The mapping of an object to a category/class may be stored/maintained as metadata in one or more databases (e.g., the database 220a).

The object audit/log device 210a-23 may maintain a running log of objects that are recognized and categorized/classified in accordance with, e.g., the object recognition device 210a-13 and/or the object categorization device 210a-22, respectively. For example, the object audit/log device 210a-23 may incorporate aspects of machine learning, whereby objects that are confirmed as having been recognized or classified may be stored in, e.g., a database (e.g., the database 220a). Similarly, objects that are not appropriately recognized or classified may be corrected via, e.g., user input such that similar occurrences likely would not occur again in the future. In this respect, the system 200a may become more intelligent/accurate over time as the information/data available in the database increases.

The resultant actions group 210a-3 may represent a tertiary level in terms of devices and/or functionality that is/are used to process/analyze the outputs provided by the user devices 202a-206a. In particular, the resultant actions group 210a-3 may process the outputs provided by the context understanding group 210a-2 in order to make decisions/determinations regarding whether particular objects are to be presented as part of a conference. Furthermore, if an object is to be presented, the resultant actions group 210a-3 may determine how that object is to be presented as part of the conference.

As shown, the resultant actions group 210a-3 may receive outputs from one or more of the user devices 202a-206a to enhance or supplement the outputs of the context understanding group 210a-2. For example, the resultant actions group 210a-3 may provide a first weight to outputs provided by the user devices 202a-206a and a second weight to outputs provided by the context understanding group 210a-2. In this manner, the resultant actions group 210a-3 can selectively provide greater weight to the outputs provided by the user devices 202a-206a relative to the outputs provided by the context understanding group 210a-2, or vice versa. In some embodiments, the outputs provided by the user devices 202a-206a to the resultant actions group 210a-3 may be used to override outputs provided by the context understanding group 210a-2 to the resultant actions group 210a-3. In this manner, control may be allocated to a user of a user device, accordingly. Such control may be conditionally granted based on the user supplying one or more access credentials.

The resultant actions group 210a-3 may include a feedback solicitation device 210a-31, an inclusion/masking device 210a-32, a learning/adaptation device 210a-33, and an object proposal device 210a-34. These devices are described in further detail below.

The feedback solicitation device 210a-31 may solicit feedback from one or more users (or, analogously, one or more of the user devices 202a-206a). For example, the feedback solicitation device 210a-31 may present the users/user devices with an indication of objects that the contextual XR system (e.g., the object proposal device 210a-34) proposes/recommends including in a conference (e.g., a presentation) or omitting/excluding from the conference. In some embodiments, the feedback solicitation device 210a-31 may only request feedback if requested to do so by the user/user device in order to avoid nuisance requests.

In some embodiments, the feedback solicitation device 210a-31 may set a timer and may act in accordance with the recommendations made by the contextual XR system 210a (e.g., the object proposal device 210a-34) upon the expiration of the timer in the absence of user/user device input that contradicts/negates the recommendations. In this manner, the user/user device may have an opportunity to override the recommendations of the contextual XR system 210a while still providing and/or omitting objects from the conference in a timely manner in the absence of user/user device input.

As described above, the object proposal device 210a-34 may provide recommendations regarding objects that are to be included and/or omitted from a conference. The generation of the recommendations may be based on the outputs of the context understanding group 210a-2. For example, the recommendations may be made in accordance with the classifications/categorizations provided by the object categorization device 210a-22. The object proposal device 210a-34 may consult the database 220a to identify and/or acquire objects that are recommended for presentation.

The inclusion/masking device 210a-32 may be operative on the basis of the feedback obtained by the feedback solicitation device 210a-31 and/or the recommendations of the object proposal device 210a-34. For example, the inclusion/masking device 210a-32 may apply one or more filters to an object in order to include or omit that object from a conference. Still further, in some embodiments the inclusion/masking device 210a-32 may apply filters of various granularities or grades in order to present the object in the conference in a preferred manner. For example, a first object that is included in the conference may have highlighting applied to it by the inclusion/masking device 210a-32 in order to emphasize the object in the conference. Conversely, a second object that is included in the conference may be partly shaded in order to still include the second object in the conference while de-emphasizing the second object relative to the first object. In this manner, an audience member's attention may be primarily focused on the first object while still obtaining a (lesser) degree of appreciation/awareness of the second object.

In some embodiments, such as for example in connection with panoramic media/content, the inclusion/masking device 210a-32 may select one or more angles/orientations for an object that is to be included in a conference. For example, the first object may be presented to a first audience member in accordance with a first orientation and may be presented to a second audience member in accordance with a second orientation that is different from the first orientation.

In some embodiments, the learning/adaptation device 210a-33 may receive feedback (for example, feedback from the feedback solicitation device 210a-31) and may adjust objects that are presented in connection with a conference based on the feedback. For example, the learning/adaptation device 210a-33 may maintain a log of user choices/selections regarding objects that are to be included or omitted from a conference in order to enhance the recommendations made by the object proposal device 210a-34 in the future. In this respect, the learning/adaptation device 210a-33 (potentially in conjunction with the object proposal device 210a-34) may incorporate aspects of machine learning. Adjustments may be made substantially in real-time (e.g., "on the fly") as such knowledge is gained.

In some embodiments, the objects included in the database 220a may be encoded at one or more resolutions to accommodate transmission over a network characterized by dynamic/changing conditions. In this manner, a particular resolution that is selected for transmission may be based on a capacity of the network or available network resources to accommodate the object. For example, when the network is lightly loaded a high resolution rendering of the object may be selected by the object proposal device 210a-34.

In some embodiments, objects included in the database 220a may be protected by one or more credentials. For example, access to an object included in the database 220a may be conditioned on a user or a device providing one or more verified/authenticated credentials. In this respect, the use of such credentials may ensure that privacy/security considerations are maintained. Additionally, the use of such credentials may help to ensure that content creators/originators associated with the object are fairly compensated for the use of such an object.

The nomenclature used in conjunction with the description of the devices of FIG. 2A is provided for the sake of ease in description and illustrative convenience. The particular nomenclature does not serve as a limitation unless expressly indicated otherwise. Moreover, the functionality that is described above as being attributed to a given device may be re-allocated to another device without loss of generality or accuracy in description. This disclosure encompasses all such variants.

The devices shown in FIG. 2A may be communicatively coupled to one another using wired connections and/or via wireless connections. In some embodiments, a first device may communicate with a second device via a bus architecture. In this respect, one or more addressing schemes may be utilized to distinguish the first device from the second device and other devices. Communications may adhere to one or more formats, signaling protocols, standards, etc. In some embodiments, the communications may be based on a transmission and reception of electromagnetic waves. Such electromagnetic waves may be conveyed as surface waves via one or more physical mediums. A physical medium might not include a return path to a source of the electromagnetic waves.

Referring back to FIG. 2A, and continuing the example set forth above regarding a construction of a stadium, the scene 230a may incorporate virtual objects 230a-1 obtained from the database 220a. The virtual objects 230a-1 may represent/include a miniaturized rendering of the stadium and/or a fuller or more expansive rendering of the stadium. In some embodiments, at least one of the virtual objects 230a-1 may be selectable by a user/user device. For example, a selection of the miniaturized rendering of the stadium may cause the fuller/more expansive rendering of the stadium to be presented. In this manner, details/objects can be temporarily omitted in order to avoid cluttering/overwhelming a display screen while still providing access to the objects based on a user request for the same.

The scene 230a depicts a first user 230a-2, a second user 230a-3, a third user 230a-4, and a fourth user 230a-5. The first user 230a-2 may be a program manager associated with a municipality that is at least partially funding the construction of the stadium, and the users 230a-3 through 230a-5 may be affiliated with an architectural firm that is overseeing the construction of the stadium. The scene 230a may depict a scheduled conference involving the users 230a-2 through 230a-5. The user 230a-4 may be present/logged-in for the conference when the user 230a-2 arrives, such that the user 230a-2 may receive/view a live video feed associated with the user 230a-4 when the user 230a-2 arrives/logs-in to the conference. Conversely, the user 230a-3 might not initially be present for the conference when the user 230a-2 arrives for the conference. As such, a still-frame image, an avatar, etc., representative of the user 230a-3 may be presented to the user 230a-2 until the user 230a-3 arrives/logs-in to the conference. The still-frame image, avatar, etc., representative of the user 230a-3 may correspond to an object included in the database 220a.

The user 230a-5 may be working remotely (e.g., may be working out of a home office) during the conference. In this respect, one or more portions of the video feed associated with the user 230a-5 may be obscured or even eliminated from the view of the user 230a-2. For example, audio generated at the remote site of the user 230a-5 may be obscured (reduced in volume) or eliminated (e.g., muted) to avoid interrupting/disrupting the flow of the conference. To illustrate further, if a sound of a crying/screaming child is detected at the remote site of the user 230a-5, background noise/sound associated with the child may be discarded from the video feed of the user 230a-5 provided to the user 230a-2.

Figure 2B:
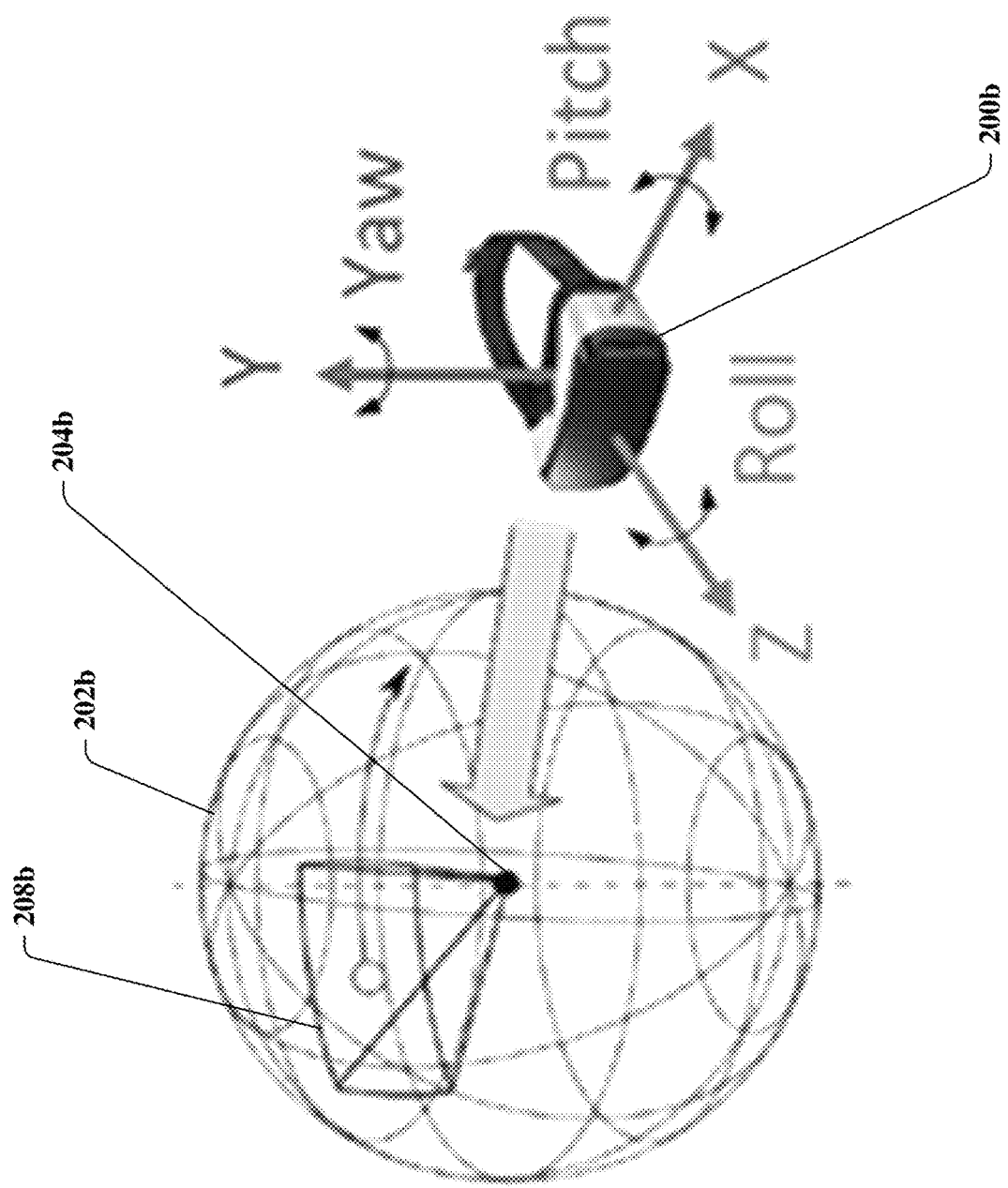
FIG. 2B depicts an illustrative embodiment of a user device formed as a headset in accordance with various aspects described herein.

One or more of the users 230a-2 through 230a-5 may utilize a user device, such as for example the devices 202a-206a. In some embodiments, a user device may include a mobile device, a laptop computer, a tablet, a headset, etc. For example, FIG. 2B is a block diagram illustrating a non-limiting embodiment of a headset 200b functioning as a user device in accordance with various aspects described herein. The headset 200b (which may correspond to one or more of the user devices 202a-206a of FIG. 2A) may be used to present one or more objects in accordance with XR technology. In some embodiments, the objects may be presented in conjunction with panoramic content (e.g., 360-degree videos).

Panoramic content may be recorded by omnidirectional cameras or camera array systems, and then "wrapped" onto at least a portion of a three-dimensional (3D) sphere (e.g., 3D sphere 202b), with the cameras at or proximate a center 204b of the sphere. When watching a panoramic video, a user/viewer at the spherical center 204b can freely control her viewing direction, so each playback may create a unique viewing experience. The control of viewing directions may be achieved through, e.g., head movement when using a head-mounted device, hand/finger movement when using a mobile/portable communication device (e.g., a phone or a tablet), a mouse click when using a laptop or desktop computer, or use of a remote control or trackball when using a display device such as a television. Other techniques, such as for example gesture recognition, may be used. One or more combinations of the controls described above may be used.

As shown in FIG. 2B, a headset 200b can be used to adjust a viewing orientation by changing the pitch, yaw, and/or roll, which correspond to movement (e.g., rotation) along the super-imposed X, Y, and Z axes, respectively. The headset 200b may support operations in accordance with six degrees/dimensions of freedom. For example, the X, Y, and Z axes collectively represent three dimensions of freedom, and movement along any one of the axes (e.g., in a plus or minus direction) represents another degree/dimension of freedom.

Panoramic video players may compute and display the viewing area based on the viewing orientation and the field of view (FoV). The FoV defines the extent of an observable area 208b, which may be a fixed or dynamic parameter of the headset 200b. In an illustrative embodiment, the observable area 208b may be 110° horizontally (+/−10%) and 90° vertically (+/−10%). Other values of the observable area 208b may be used in some embodiments.

Figure 2C:
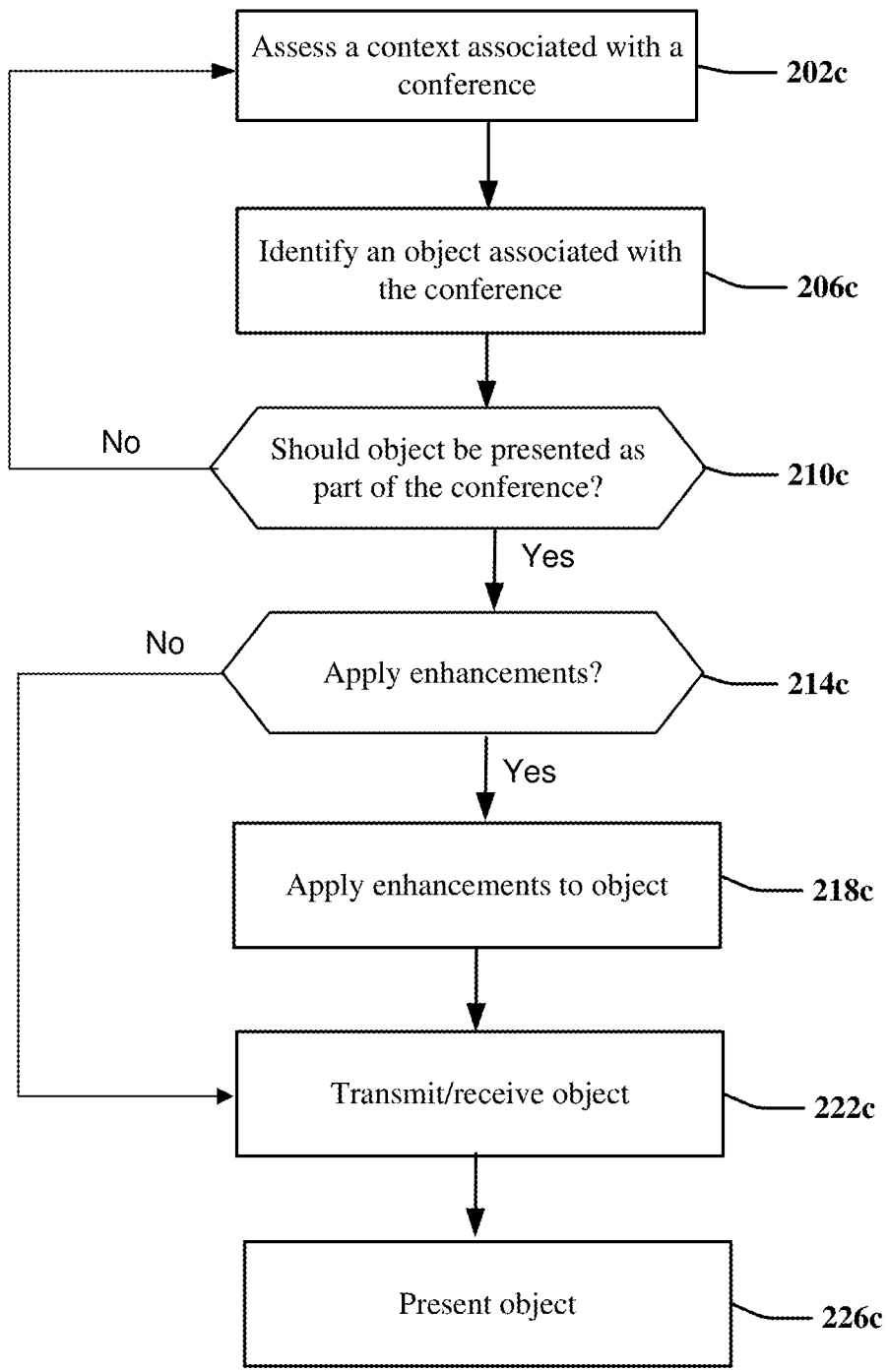
FIG. 2C depicts an illustrative embodiment/flowchart of a method in accordance with various aspects described herein.

FIG. 2C depicts an illustrative embodiment of a method 200c in accordance with various aspects described herein. The method 200c may be used to control/regulate a presentation of objects as part of a conference. The method 200c may be executed in conjunction with/by one or more systems, devices, or components, such as for example, one or more of the systems, devices, or components described herein. The method 200c may be operative/executed on the basis of one or more inputs, such as for example one or more inputs provided by one or more of the systems, devices, or components described herein.

In block 202c, an assessment may be made regarding a context associated with a conference. For example, the assessment may be based on inputs provided by, or obtained from, one or more users/user devices, one or more databases, etc.

In block 206c, an object associated with the conference may be identified. In some embodiments, the identification may be based on/responsive to, the assessment of the context in block 202c.

In block 210c, a determination may be made regarding whether the object identified in block 206c should be presented as part of the conference. For example, the assessed context of block 202c may suggest that the object should not be included, privacy/security considerations may suggest that the object should not be included, etc.

If the object should not be included (e.g., the "no" path is taken from block 210c), flow may proceed back to block 202c for purposes of continuing to monitor/assess the context of the conference (with any updates to the context noted accordingly).

If the object should be included (e.g., the "yes" path is taken from block 210c), flow may proceed to block 214c.

In block 214c, a determination may be made whether any enhancements should be applied to the object. The determination of block 214c may be based on one or more factors/considerations, such as for example user preferences, a user/device profile, network parameters, the assessed context of block 202c, etc.

If enhancements should be applied to the object (e.g., the "yes" path is taken from block 214c), flow may proceed to block 218c. Otherwise (e.g., the "no" path is taken from block 214c), flow may proceed to block 222c.

In block 218c, enhancements may be applied to the object. The enhancements may include one or more of changing a volume/sound associated with the object, changing an appearance of the object (e.g., highlighting the object, changing a color of the object, changing a size of the object, changing an orientation of the object, selecting a camera/viewing angle associated with the object, etc.), etc. In some embodiments, the enhancements applied as part of block 218c may tend to emphasize the object or de-emphasize the object. In some embodiments, as part of block 218c a first portion of the object may be emphasized and a second portion of the object may be de-emphasized. In some embodiments, an enhancement applied in block 218c may be applied in conjunction with an enhancement to another/second object associated with the conference. In some embodiments, one or more enhancements that may be applied as part of block 218c may be stored in, e.g., a database. Storing such enhancements may facilitate future use of such enhancements without having to incur the (processing) cost/penalty of having to re-generate the enhancements.

In block 222c, the object may be transmitted from a first device (e.g., a first user device, a server, a network node/element, etc.) to one or more additional devices (e.g., a second user device, a second server, a second network node/element, etc.). The one or more additional devices may receive the object, accordingly. The one or more additional devices may be identified on the basis of a list of participants to the conference.

In block 226c, the object may be presented as part of the conference. Such a presentation may include audio, video, visual/still imagery, simulations, cinematic renderings, etc.

While for purposes of simplicity of explanation, the method 200c is shown and described as a series of blocks in FIG. 2C, it is to be understood and appreciated that the claimed subject matter is not limited by the order of the blocks, as some blocks may occur in different orders and/or concurrently with other blocks from what is depicted and described herein. For example, in some embodiments, any enhancements applied to an object (block 218c) may occur subsequent to a transmission/reception of the object (block 222c). Proceeding in that manner may help to conserve network resources (e.g., transmission bandwidth) by reducing the amount of data/information that needs to be transmitted across the network as well as providing an ability to customize/tailor the enhancements at a recipient device. Moreover, not all illustrated blocks may be required to implement the methods described herein. In some embodiments, additional blocks not shown may be included.

Additional aspects of this disclosure are set forth below; these additional aspects may be applied in conjunction with the systems, devices, components, and methods described above.

Aspects of this disclosure facilitate the use and presentation of various objects, inclusive of various tools, models, renderings, etc., in accordance with XR technology. Aspects of the disclosure may include a user's and/or a machine's interaction with one or more objects to facilitate an understanding of how the object interacts with, e.g., a surrounding environment. Still further, a context associated with the object or a conference (e.g., a presentation) may serve as a factor/parameter in terms of whether an object is included as part of a conference as well as any characteristics that may be selected in terms of a presentation of that object as part of the conference.

Aspects of this disclosure may provide for low-latency and seamless transitions between automated/robotic/machine support and human support. In some embodiments, placeholders (e.g., metadata) may be incorporated to facilitate such transitions, thereby providing a unified experience for consistency in presentation.

As described above, in some embodiments a virtual object may be used as a placeholder. For example, a human avatar may indicate that a first user/participant in a conference is in the process of logging-in or connecting to the conference; once the connection is established, the avatar may be replaced with a live video feed of the first user, another object, etc. In some embodiments, triggers may be generated to create/generate, retrieve, or notify objects in terms of an inclusion of such objects in a conference. In some embodiments, annotations (e.g., words, data, visuals, etc.) may be provided in XR that are shared with at least one, and potentially all, users/participants to a conference. Such annotations may be made available to one or more users/user devices in accordance with one or more profiles (e.g., one or more user profiles, one or more device profiles, etc.).

As described above, aspects of the disclosure may be used to create/generate a log of objects. Such a log may be inspected for a variety of reasons/purposes. For example, in the context of a manufacturing plant, the log may be inspected to ensure that production orders are timely filled, to ensure that manufactured parts adhere to one or more requirements/specifications, etc. The log may include a date and time stamp or other indicator that ties/maps the creation/generation and/or modification of an object to the object. In this respect, the log may be used to provide version-control with respect to an object. Version-control may be particularly useful during product development cycles, where tests may be conducted on various versions of the product in order to refine the product to achieve particular uses/functions.

In some embodiments, the log may be used to confirm whether a particular object was shared with a given user at a particular point in time. For example, information contained in such a log may be used to confirm that new employees have been trained on appropriate safety measures/procedures that are to be observed at the manufacturing plant.

In some embodiments, transactions regarding particular objects may be included as part of a distributed ledger for purposes of authenticating that the transactions occurred. For example, aspects of the disclosure may be incorporated in conjunction with blockchain-based technologies.

Aspects of the disclosure may utilize machine learning to determine when an object should be captured and transmitted as part of a conference. In this manner, network resources may be preserved by only transmitting those objects (or portions of objects) that are necessary for a contextual understanding of the subject matter of the conference at any given point in time. Stated differently, aspects of the disclosure may reduce (e.g., minimize) an amount of data/information that is transmitted in a network.

From the perspective of an audience member/recipient of a conference, if fewer objects are included as part of the conference, that may have a tendency to reduce (e.g., minimize) a number of complications for, e.g., visualization. In this respect, the audience member may be better-positioned to understand the nature of the subject matter of the conference. In this respect, aspects of the disclosure may be applied in connection with instructional uses, such as for example education (e.g., video-based distance-learning), customer support functions, tours (e.g., virtual tours), reporting (e.g., news reporting), etc. In contrast to conventional solutions that incorporate pre-recorded video and manual annotation, embodiments of this disclosure may determine from a video-feed, in real-time, what objects are of interest/significance and include them accordingly. In this respect, aspects of the disclosure break the paradigm of a one-size-fits-all approach by facilitating customized/tailored subject matter during a conference based on inputs (e.g., audience or participant-based inputs, actions/events that unfold/develop live, etc.) that are received (and might only be known/determined/identified) during the conference.

Aspects of the disclosure may be applied in connection with medical applications. For example, in connection with surgeries or other medical procedures, a first user/person and/or a first robot may be onsite with a patient and additional users and/or robots may be remotely located from the patient. The additional users and/or robots may be responsible for overseeing/inspecting individual portions/parts of the patient and/or the medical procedures.

As described above, aspects of the disclosure may include a representation (e.g., an image, an avatar, etc.) of a first user that is available to participate in a conference. In some embodiments, the first user may be prompted to participate in the conference based on an identification of a need for the first user to participate. For example, a determination may be made to prompt the first user to participate in the conference once trigger words/expressions associated with the first user's skill set or expertise are identified. In this respect, aspects of the disclosure may facilitate an efficient use of resources (e.g., human resources) by only including the resource when needed. Still further, one or more devices or systems may prepare an agenda with questions or requests for information for the first user, such that when the first user joins the conference the first user has an immediate understanding of what is being requested from the first user. The agenda may include objects that may help to bring the first user up-to-speed or refresh the first user's memory/recollection as to the subject matter of what is being discussed or presented. In this respect, subject matter that was previously covered during an earlier portion of a conference might not need to be covered again once the first user joins the conference.

A transmission of fewer objects may increase the security/privacy associated with a user's environment, data, information, etc. For example, aspects of the disclosure may obscure (e.g., remove or eliminate) objects that may be present in the background of a field of view of a camera. In this respect, aspects of the disclosure may protect sensitive information that a user does not want to share with other users.

In some embodiments, one or more filtration schemes may be implemented at a receiver of a communication link to obscure one or more objects. For example, if a conference is occurring/in-progress between members of a family, and an object shared by an adult member of the family relates to an adult-natured topic, the object may be transmitted to a user device of a child of the family but the user device might not present (e.g., display) the object. More generally, metadata (or any other form of tag/flag) applied to/associated with an object may be used to indicate whether the object is suitable for a particular user device or user, thereby allowing the user device to filter-out inappropriate objects.

Aspects of the disclosure may combine information/data obtained from various sources (e.g., various devices) to determine/identify objects to be included as part of a conference. For example, aspects of the disclosure may provide for an analysis of visual, audio, tactile, and/or action-based inputs to determine/identify such objects.

Aspects of the disclosure may be based on a contextual understanding of the subject matter of a conference. For example, in connection with a meeting notice (potentially incorporated as part of one or more applications, e.g., email or calendar applications) transmitted from a meeting organizer to participants in a meeting, a subject line of the meeting notice, a main body of the meeting notice, and/or any attachments (e.g., files) to the meeting notice may be analyzed to identify the subject matter of the meeting notice and any objects that may be relevant to the meeting. In this respect, such objects may be identified in advance of the meeting and may be pre-fetched or stored in a local memory/buffer/cache of a user device to reduce (e.g., minimize) any lag in terms of a presentation of such objects during the meeting. The local memory may be resident at a user device of the meeting organizer, a user device of one or more of the meeting participants, or a combination thereof.

Aspects of the disclosure may provide for contextual understanding of the subject matter associated with a conference or an object based on a grouping of the object with one or more additional objects. For example, the role/function of the object may be determined (e.g., learned) based on an association between the object and one or more other objects. In this respect, an object may be tagged with metadata that identifies a relationship between the object and one or more other objects. Such contextual understanding may facilitate/allow for user specific actions and feedback from users for purposes of further identifications.

In some embodiments, objects may be shown or obscured as part of a conference. In some embodiments, a first system or device may determine whether a particular object should be shown or obscured based on an exchange with a second system or device. Based on feedback received from the second system/device, the first system/device may learn an appropriate solution/technique for future interactions in connection with the same or a related context. More generally, aspects of the disclosure may provide for machine learning in connection with a federation-based approach, where a first system/device may include other users, systems, devices, etc., as appropriate in a given context.

In some embodiments, a first object (e.g., a drone, a robot, an additive manufacturing device/system, etc.) may be invoked to create/generate/retrieve a second object. A virtual representation of the second object may be replaced with a physical embodiment/form-factor of the second object once the physical embodiment is available.

Aspects of the disclosure provide for a creation of an object based on contextual inputs and/or user inputs. Such inputs may take one or more forms, such as for example gesture-based inputs, visual-based inputs, tactile-based inputs, audio-based inputs, etc. A given input may be simulated to determine what the impact of the input is on a given object. In this respect, aspects of the disclosure may be used to perform tests/trials on a virtual representation of a given object before implementing the same in connection with a physical embodiment of the object. The ability to perform such simulations can have a significant impact where, for example, availability of the physical embodiment of the object is limited.

Aspects of the disclosure may take into account capabilities of user's to process data/information. For example, aspects of the disclosure can customize/tailor a presentation of an object based on a disability that a user may have (e.g., color blindness). Various parameters associated with a presentation of an object, such as for example color, sharpness/focus, font sizes, etc., may be selected to suit the needs or desires/preferences of particular users.

As described above, aspects of the disclosure may facilitate altering an appearance of an object that is presented as part of a conference. The appearance may be altered based on a user interaction with the object and/or based on some other contextual parameter. For example, when an object (e.g., a physical object) is being heated, a red highlighting may be applied to the object to emphasize the increase in temperature of the object. Similarly, one or more emoticons/emojis/icons may be applied, such as for example a thermometer with rising mercury or a sweating-facial expression.

Aspects of the disclosure may be employed to selectively reveal/show, hide/obscure, or notify objects based on interactions and presented content. In some embodiments, an initial portion of a conference may entail discussion/conversation. In some embodiments, a scene associated with a conference may include some or all objects that are captured or recorded by, e.g., a camera and selective masking/inclusion may be applied to the objects as appropriate. If there is prior knowledge available regarding the discussion/conversation, such as for example an identification of a person/user that is speaking, certain objects may start being emphasized. For example, in a customer support scenario only an object corresponding to the target product may be initially visible.

Aspects of the disclosure may provide for a continuous analysis of interactions and content streams associated with one or more users/parties to a conference. In some embodiments, based on high-speed or unusual actions, significant changes in volume/sound, etc., an object may be selected for inclusion or omission in the conference. In this respect, a comparison may occur between a given parameter and one or more thresholds as part of a decision-making procedure.

In some embodiments, based on a user interaction with an object, such as for example an object that is not being shared as part of a conference, the object may subsequently be shared in the conference. In some embodiments, the object may be shared outside of the conference, such as for example in connection with an email, a message, a social media platform, etc.

In some embodiments, different forms of an object may be provided/presented to a user/user device based on an identification of the user/user device. For example, in connection with an exam/quiz provided in an educational/school environment, the questions included in the quiz may be based on a user profile associated with the user/user device. Thus, a first user/student may receive a first set of questions and a second user/student may receive a second set of questions that are at least partially different from the first set of questions (in terms of substantive content, numbered ordering, or a combination thereof).

In some embodiments, based on a recognition of visual or audio signals (e.g., speech keywords or a user touching a keyboard or other objects), objects (e.g., XR objects) may begin to be included as part of a conference, masked/obscured as part of a conference, etc. As discussion topics tend to diverge or drift away from a first topic towards a second topic, objects associated with the first topic may begin to be omitted or obscured and objects associated with the second topic may be presented/shared.

In some embodiments, objects to be included as part of a conference may be recommended based on user interactions with objects and/or user preferences in connection with objects. In some embodiments, user interactions with objects may be shared as part of a user profile; the user profile may be included as part of a social media platform. In this respect, a first user's interaction with an object may motivate contacts of the first user to similarly interact/engage with the object. Thus, aspects of the disclosure may be used to generate reviews of objects (e.g., products) that may be shared with other users.

As described above, aspects of the disclosure may include features associated with machine learning. In some embodiments, contributions provided by multiple users/user devices may be combined (e.g., weighted) to identify/map particular objects with particular contexts/scenarios. Obtaining information/data from a large user-base may tend to enhance the accuracy of machine learning algorithms by effectively filtering-out/de-emphasizing fringe or idiosyncratic feedback or highly-individualized interactions for the mass/majority of users, while still providing an ability to cater to individual preferences/desires via an incorporation of user profiles.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the system 200a, the user device 200b, and the method 200c presented in FIGS. 1, 2A, 2B, and 2C. For example, virtualized communication network 300 can facilitate in whole or in part an assessment/identification of a context associated with a conference, an identification of an object associated with the conference in accordance with the context, and a presentation of the object as part of the conference.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
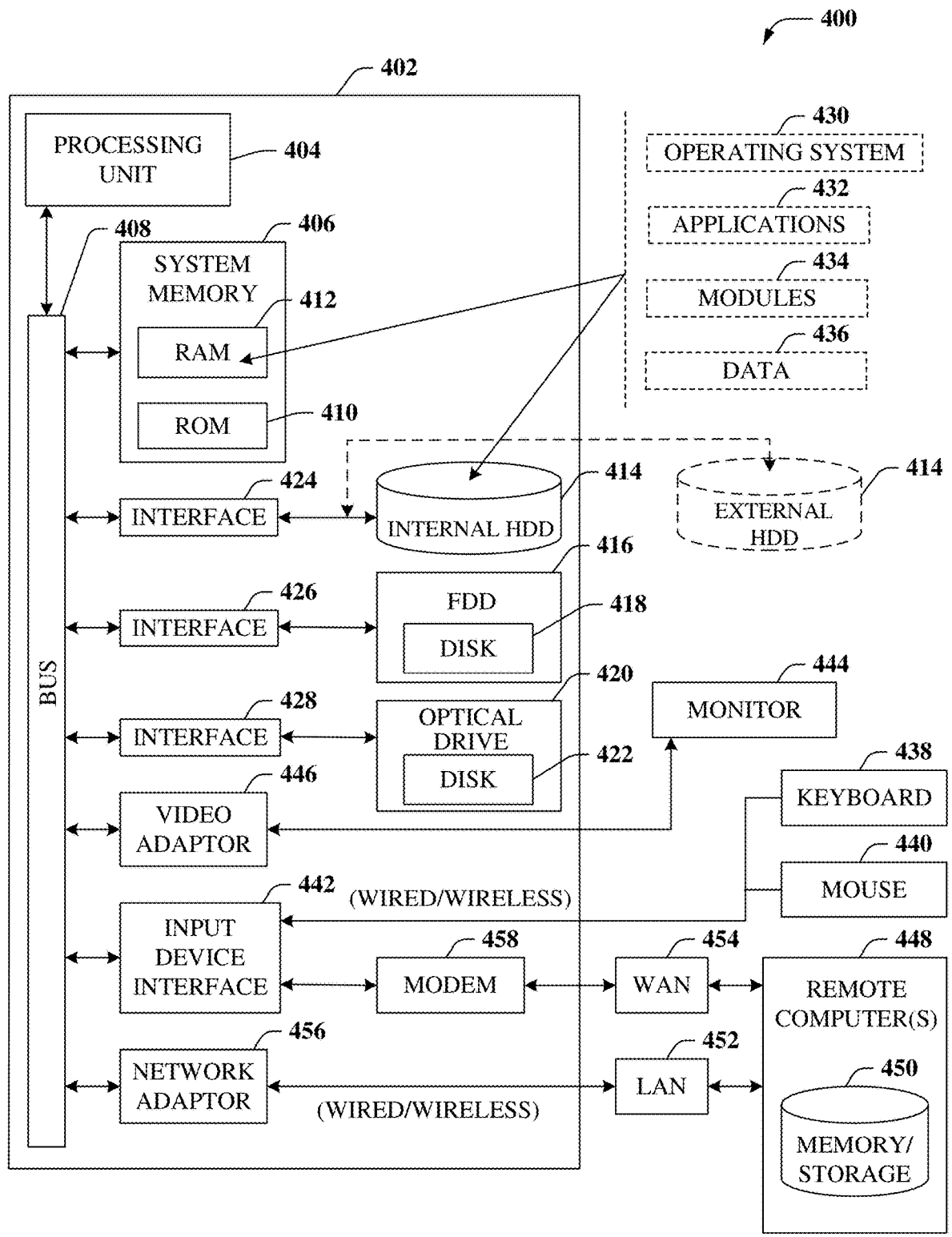
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an assessment/identification of a context associated with a conference, an identification of an object associated with the conference in accordance with the context, and a presentation of the object as part of the conference.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
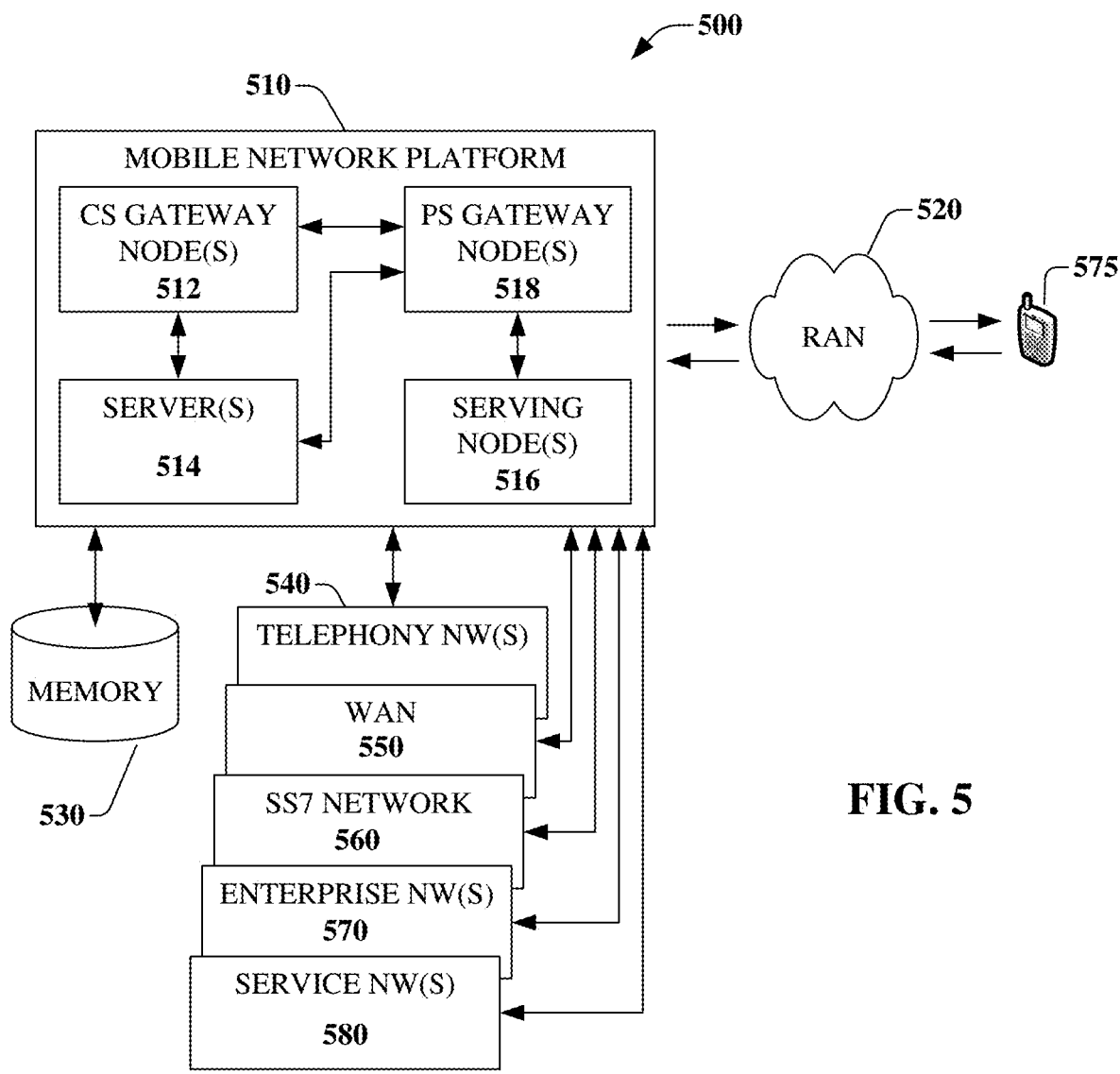
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part an assessment/identification of a context associated with a conference, an identification of an object associated with the conference in accordance with the context, and a presentation of the object as part of the conference. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
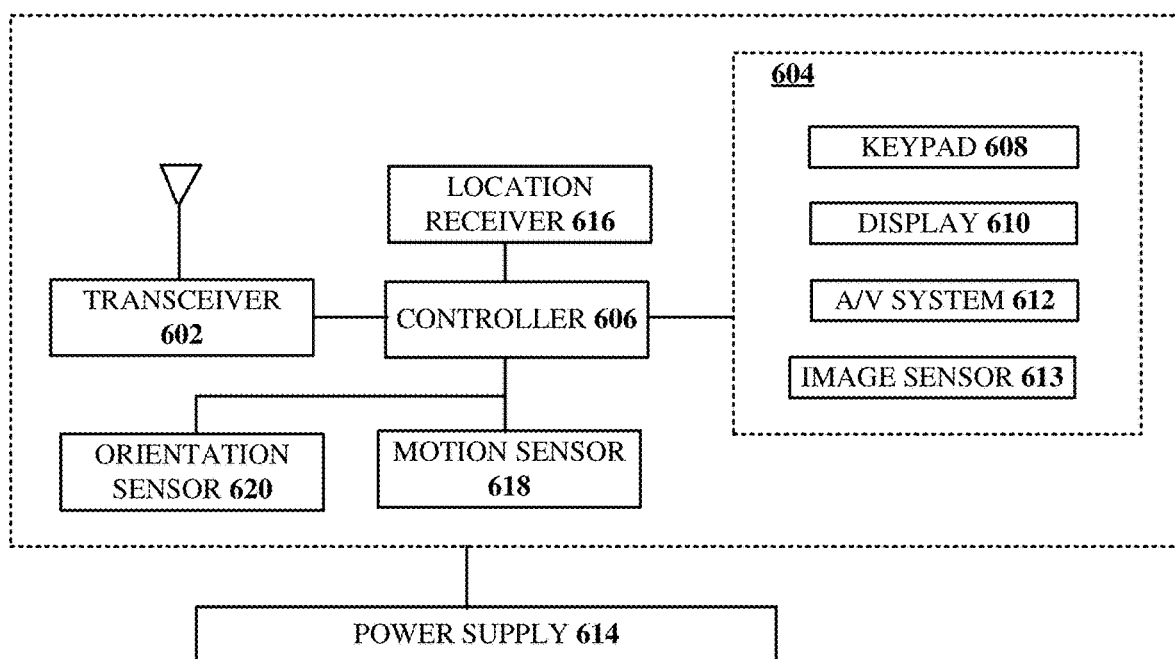
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part an assessment/identification of a context associated with a conference, an identification of an object associated with the conference in accordance with the context, and a presentation of the object as part of the conference.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a first virtual object associated with a videoconference based on an assessed first context of the videoconference, wherein the first virtual object is a non-physical object;
providing the first virtual object as a recommendation;
setting a timer responsive to the providing of the first virtual object as the recommendation;
determining whether user feedback is received in response to the recommendation prior to an expiration of the timer;
responsive to determining that a representation of the first virtual object should not be included as part of the videoconference based on the user feedback being received prior to the expiration of the timer, causing the representation of the first virtual object to be excluded from a presentation associated with the videoconference; and
responsive to determining that the representation of the first virtual object should be included as part of the videoconference based on the user feedback or based on the expiration of the timer, causing the representation of the first virtual object to be included in the presentation.

2. The device of claim 1, wherein responsive to the determining that the representation of the first virtual object should not be included as part of the videoconference:
assessing a second context associated with the videoconference;
identifying a second virtual object associated with a subject matter of the videoconference based on the assessing of the second context; and
responsive to determining that a representation of the second virtual objected should be included as part of the videoconference, causing the representation of the second virtual object to be included in the presentation.

3. The device of claim 1, wherein responsive to the determining that the representation of the first virtual object should be included as part of the videoconference:
applying an enhancement to the first virtual object resulting in a first enhanced virtual object.

4. The device of claim 3, wherein the operations further comprise:
transmitting the first enhanced virtual object to a second device to cause the second device to include the first enhanced virtual object as the representation of the first virtual object in the presentation at the second device.

5. The device of claim 1, wherein the operations further comprise:
performing a visual analysis of image data to recognize a first object associated with the first virtual object.

6. The device of claim 5, wherein the operations further comprise:
performing audio processing on audio data to recognize the first object.

7. The device of claim 6, wherein the audio processing comprises natural language processing.

8. The device of claim 1, wherein the operations further comprise:
assessing a second context associated with a conference subsequent to receiving the user feedback;
identifying the first virtual object, a second virtual object, or a combination thereof as being associated with a subject matter of the conference based on the second context and the user feedback; and
causing the representation of the first virtual object, a representation of the second virtual object, or a combination thereof to be included in a presentation associated with the conference.

9. A non-transitory machine-readable medium, comprising executable instructions that, when executed by a processing system including a processor, facilitate performance of operations, the operations comprising:
identifying an object based on image data;
determining a context associated with a conference;

incorporating the object as part of a class of a plurality of objects;

presenting a second object included in the class as part of the conference based on determining that the context calls for a second object included in the class;

presenting the object as part of the conference based on the context and responsive to the determining that the context calls for the second object, wherein the object includes a virtual object, an augmented reality object, or a combination thereof, and wherein the object is presented as a selectable object as part of the conference;

determining that a plurality of enhancements should be applied to the object, wherein the plurality of enhancements includes changing an appearance of the object, and wherein the changing of the appearance of the object includes highlighting the object, changing a color of the object, and changing an orientation of the object; and responsive to the determining that the plurality of enhancements should be applied to the object, applying the plurality of enhancements to the object as part of the presenting of the object as part of the conference.

10. The non-transitory machine-readable medium of claim 9, wherein the determining that the plurality of enhancements should be applied is based on a network parameter, wherein the plurality of enhancements further includes changing a volume associated with the object, and wherein the changing of the appearance of the object further includes changing a size of the object.

11. The non-transitory machine-readable medium of claim 10, wherein the determining that the plurality of enhancements should be applied is further based on user preferences and a device profile.

12. The non-transitory machine-readable medium of claim 11, wherein the applying of the plurality of enhancements includes emphasizing a first portion of the object and de-emphasizing a second portion of the object.

13. The non-transitory machine-readable medium of claim 9, wherein the presenting of the object as part of the conference comprises presenting the object in accordance with a first camera view at a first user device and presenting the object in accordance with a second camera view at a second user device, and wherein the second camera view is different from the first camera view.

14. The non-transitory machine-readable medium of claim 9, wherein the presenting of the object as part of the conference is based on a user profile, a user device profile, an identification of a user camera, an identification of an environmental camera, first data provided by an environmental sensor, second data provided by a surveillance device, or a combination thereof.

15. The non-transitory machine-readable medium of claim 9, wherein the operations further comprise:
performing a visual analysis of the image data to detect the object, thereby resulting in a detected object;
comparing the detected object to a plurality of objects included in a database, wherein the plurality of objects includes the object; and
selecting the object based on determining that a difference between the detected object and the object is less than a threshold.

16. The non-transitory machine-readable medium of claim 9, wherein the operations further comprise:
receiving audio data from at least one camera, a microphone, or a combination thereof; and
processing the audio data, thereby resulting in processed audio data,
wherein the identifying of the object is further based on the processed audio data.

17. A method, comprising:
identifying, by a processing system including a processor, a cross reality object based on a image data, audio data, or a combination thereof;
presenting, by the processing system, the cross reality object in a videoconference in accordance with a first camera view at a first user device and a context associated with the videoconference;
presenting, by the processing system, the cross reality object in accordance with a second camera view at a second user device,
wherein the second camera view is different from the first camera view; and
assessing the context associated with the videoconference based on an analysis of a meeting notice associated with the videoconference, wherein the meeting notice includes a subject line, a main body, at least one attachment, and an identification of a plurality of participants in the videoconference.

18. The method of claim 17, wherein the cross reality object comprises second image data, second audio data, or a combination thereof, wherein the cross reality object includes a selectable object, and wherein the method further comprises:
receiving a selection of the cross reality object;
assessing, by the processing system, a second context associated with the videoconference responsive to the selection of the cross reality object;
identifying, by the processing system, a second cross reality object based on the second context; and
presenting, by the processing system, the second cross reality object in the videoconference in accordance with the second context.

19. The method of claim 17,
wherein the cross reality object includes a still image, an avatar, an emoticon, an emoji, or a combination thereof, that is representative of a first participant of the plurality of participants when a user device of the first participant is logging-in to the videoconference, and
wherein the cross reality object includes a live video feed of the first participant when a connection is established with the user device and a server that is at least partially hosting the videoconference.

20. The method of claim 17, further comprising:
generating, by the processing system, a log that indicates that the cross reality object was shared with: a first user of the first user device at a first point in time and a second user of the second user device at a second point in time; and
incorporating, by the processing system, the log in accordance with a distributed ledger.

\* \* \* \* \*